Jan. 12, 1943. H. HOOVER, JR 2,307,791
SEISMIC EXPLORATION SYSTEM
Filed July 26, 1939 2 Sheets-Sheet 1

INVENTOR.
HERBERT HOOVER JR.
BY
ATTORNEYS.

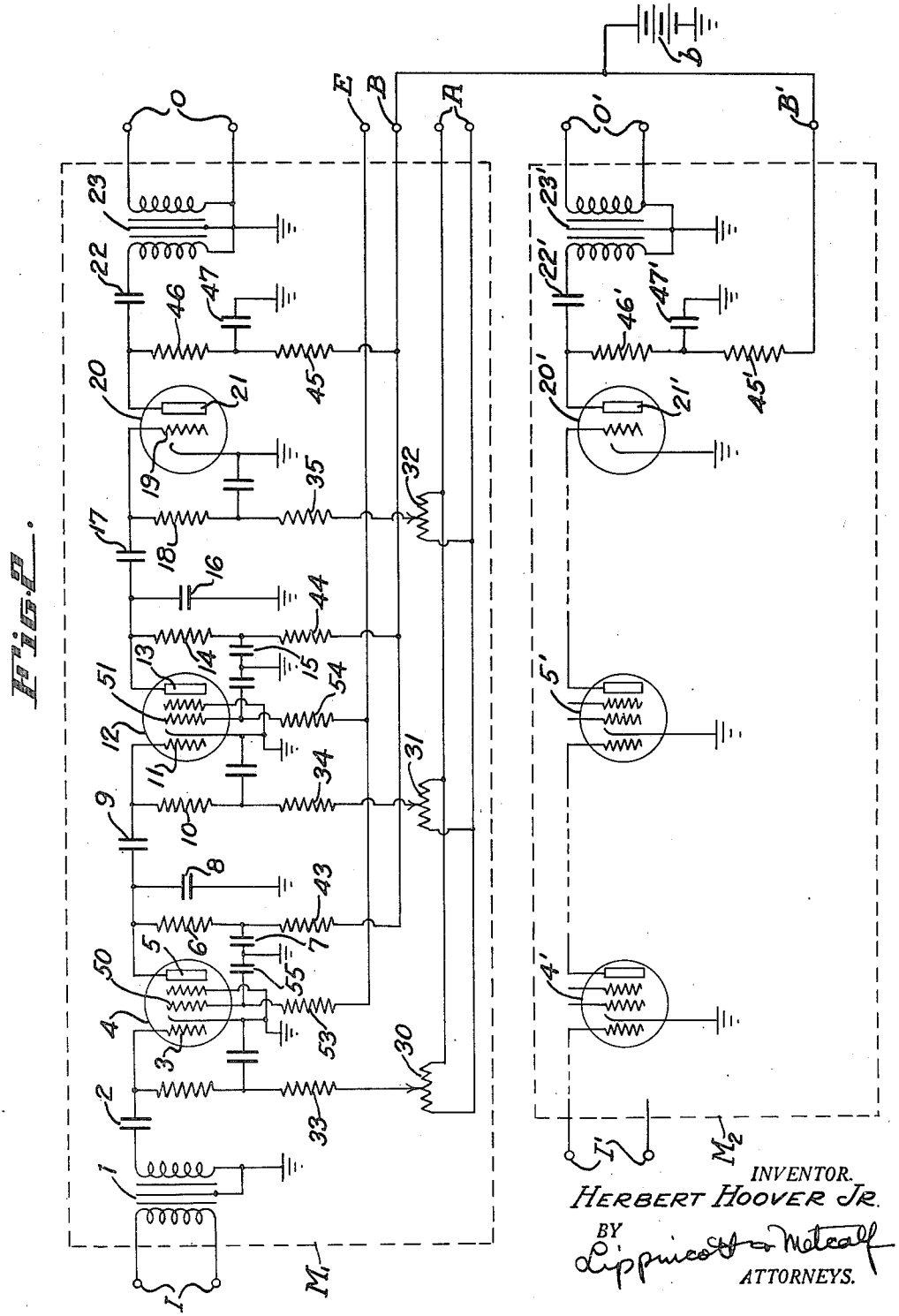

Patented Jan. 12, 1943

2,307,791

UNITED STATES PATENT OFFICE 2,307,791

SEISMIC EXPLORATION SYSTEM

Herbert Hoover, Jr., Sierra Madre, Calif., assignor to Consolidated Engineering Corporation, Pasadena, Calif., a corporation of California Application July 26, 1939, Serial No. 286,649

2 Claims. (Cl. 177—352)

The present invention relates to the use of a plurality of seismic wave amplifiers and in particular to the use of a common power or voltage supply, a common gain control, or other common element. By means of my invention I am able to provide high gain seismic wave amplifiers of reduced weight and at increased economy without the introduction of undesirable crossfeed between channels.

In conducting seismic exploration it is customary to receive seismic waves at a plurality of receptors positioned at spaced points on the surface of the earth. Electrical waves generated by said receptors in response to seismic waves reaching the various surface positions are applied to a corresponding set of amplifiers and recorders. Batteries or other power supplies are used to furnish power to the seismic wave amplifiers. Usually provision is made for varying the gain of the amplifiers during recording to compensate for variations in amplitude of the received seismic waves.

To preclude the possibility of undesirable crossfeed between amplifiers they must be isolated as completely as possible from each other. For this reason it has been customary to use separate power supplies and gain control elements for each amplifier. Use of such separate power supplies and control elements increase both the weight and cost of the apparatus used in seismic exploration.

According to my invention I provide a plurality of seismic wave amplifiers with a common element such as a power supply, or a gain control unit, and simultaneously provide means for preventing undesirable crossfeed between amplifiers.

Objects of my invention are: to provide a plurality of seismic wave amplifiers with common elements and thus reduce weight and avoid unnecessary multiplication of similar elements; to provide a plurality of seismic wave amplifiers with a common gain control element; to provide a plurality of seismic wave amplifiers with a common power supply; to provide a plurality of seismic wave amplifiers with a common voltage supply; and to prevent crossfeed between seismic wave amplifiers using a common voltage supply element.

Other objects of my invention will be apparent or will be specifically pointed out in the description forming a part of this specification, but I do not limit myself to the embodiment of the invention herein described, as various forms may be adopted within the scope of the claims.

Referring to the drawings:

Fig. 2 is a detailed wiring diagram illustrating one embodiment of my invention.

Figure 1:
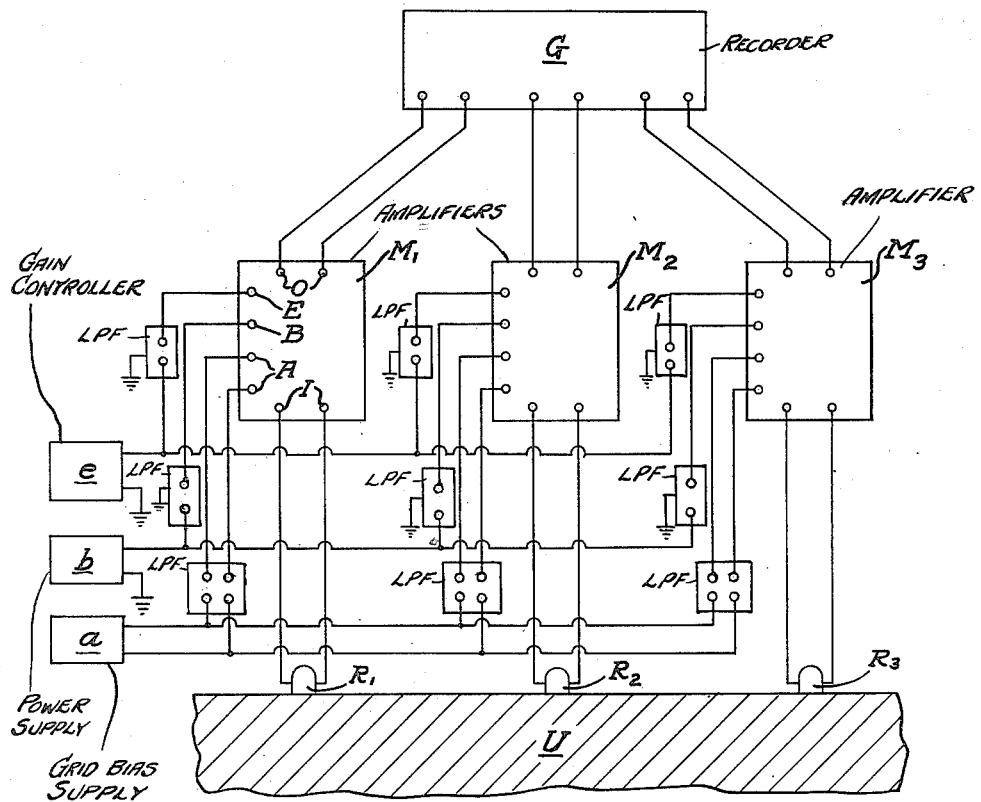
Fig. 1 is a block diagram illustrating the application of my invention to three seismic wave amplifiers.

In Fig. 1, U represents a vertical cross-section of the earth. Seismic wave receptors $R_1$, $R_2$ and $R_3$ planted on the surface are adapted to convert oscillatory earth movements received at the various receptor positions into corresponding oscillatory electrical waves. In the form of my invention shown the electrical output of the receptors $R_1$, $R_2$ and $R_3$ are amplified separately by the corresponding amplifiers $M_1$, $M_2$ and $M_3$. The outputs of said amplifiers are impressed on separate elements of the multiple element recording galvanometer G.

Units $a$, $b$, and $e$ represent common sources used to supply various voltages to the amplifiers $M_1$, $M_2$, and $M_3$. It is to be understood that I can use more than three amplifiers with common voltage supplies, in fact as many as twelve or more.

In Fig. 2 I have represented wiring details of seismic wave amplifiers $M_1$ and $M_2$. Electrical waves generated by a receptor and applied to the input terminals I—I of amplifier $M_1$ are transferred through transformer 1, and condenser 2 to grid 3 of tube 4. Corresponding amplified signals generated in the plate 13 circuit are similarly transmitted through a band pass filter comprising plate resistor 14, condensers 15, 16, and 17, and grid resistor 18 to grid 19 of tube 20. Corresponding voltages produced in the plate 21 circuit are passed through condenser 22 and transformer 23 appearing at the output terminals O—O, to which is connected a recording galvanometer or other signal reproducer.

Voltage source $a$ connected across terminals A—A supplies bias to the grids of the tubes 4, 12, and 20 through potentiometers 30, 31, and 32, which are connected to grids 3, 11, and 19 through the respective resistors 33, 34, and 35.

Voltage source $b$ supplies voltage to the plates 5, 13, and 21 through the resistors 43, 44, and 45.

Voltage source $e$, connected to terminal E, is a gain control device which applies gain control voltages to the screens 50 and 51 through the screen resistors 53, and 54. Said gain control voltages may be varied in one of many ways such as: as a function of time or as a function of output voltage of one of the amplifiers, in any manner suitable for varying the gain of the amplifier in compensating relation to the variable strength of waves reaching receptors $R_1$ and amplified by said amplifier $M_1$.

Amplifiers $M_2$ and $M_3$ have wiring and connections substantially identical with those of amplifier $M_1$.

According to my invention I connect the common voltage sources $a$, $b$, and $e$ to each amplifier through a low pass filter which has a frequency cut-off below the range of useful frequencies occurring in seismic waves which are to be amplified.

For example, in Fig. 2 I have shown details of the plate connections of tubes 4, 12, 20, and 4', 5', 20' of amplifiers $M_1$ and $M_2$ respectively.

Plates 21 and 21' are connected to the common power supply b through resistors 46, 43, 46', and 45', respectively as shown.

So far as A. C. is concerned the load impedances of the tubes 20 and 20' are grounded through the respective condensers 47 and 47'. Resistors 45 and 45' are high compared to the resistance that battery b will have at any part of its life cycle. At the beginning of its life a 180 volt dry cell battery may have a resistance of about 2 ohms, toward the end of its useful life the resistance may be about 100 ohms. I choose a value for resistances 45 and 45' at about 25,000 or 100,000 ohms.

The other amplifier tubes are connected to power supply b in a similar manner. Plates 5 and 13 of tubes 4 and 12 of amplifier M1 are supplied power through resistor 43 and 44, respectively as shown, condensers 7 and 15 being used for filtering purposes in the associated plate circuits.

The usual range of seismic wave periods of interest in seismic prospecting extends from about 0.05 to 0.006 sec. By selecting the time constant of the resistors 45 and 45' and their respective associated condensers 47 and 47' at about 0.1 sec. or more, I provide low pass filters which substantially reduce crossfeed between seismic wave amplifiers M1 and M2 through the common power supply b.

By means of my invention the crossfeed which does occur is kept small. Signals appearing at plate 21' are impressed on the primary of transformer 23' through resistor 46' and condensers 22' and 47'. By choosing resistor 46' of such value that its impedance is high compared with the impedance of condenser 47', it is readily seen that the portion of the signal voltage appearing across condenser 47' is small. A small portion of this condenser voltage appears across battery b in accordance with the ratio of battery resistance to the resistance 45'. As pointed out hereinabove battery b is common to both amplifiers M1 and M2 and all stages of each amplifier. Hence the small voltage from tube 20' appearing across battery b will be impressed on the grid 11 circuit of tube 12 of amplifier M1 through resistor 43. Condenser 7 and resistor 43 form a low pass filter which attenuates signals from battery b. Condenser 8 and resistor 6 also cooperate to attenuate any high frequency waves from battery b before application to grid 11.

The above mentioned filters all contribute to reducing crossfeed through battery b to a value which is imperceptible in the output of the respective amplifiers.

Thus it is seen that I prevent crossfeed through common battery b by connecting each plate circuit to said battery through a separate low pass filter comprising a resistor in series with said load and said battery and a grounded condenser connected to the common point between said plate circuit and said resistor.

While it is recognized that undesirable D. C. voltage losses occur in said filter resistors, I have found that when I use large voltage dry cells as the power supply b the increases in voltage required is more than offset by the reduction in weight by use of common batteries. Furthermore, by using a common power supply b I am able to provide higher voltages than would otherwise be practical and I thereby achieve high gain without appreciable increase in cost or weight.

The scope of my invention is not limited to common plate power supplies but includes other common units used to supply voltage to similar elements of a plurality of seismic wave amplifiers.

Thus common battery unit a supplies bias to all the amplifier tube grids. The amplifiers M1, M2, and M3 are each connected as M1 shown in Fig. 2 where each grid 3, 11, and 19 is connected to battery a through a grid resistor and a separate RC low pass filter.

In another application of my invention the gains of all amplifiers M1, M2, and M3 are varied simultaneously by the common gain control unit e by application of gain control voltage to gain control grids through low pass RC filters. As illustrated in Fig. 2 I apply gain control voltages from terminal E to screen grids 50 and 51 through the respective resistors 53 and 54 and across the respective associate condensers 55 and 56.

Thus it is seen that my invention provides for supplying voltage or power from a common source to similar elements of a plurality of seismic wave amplifiers and prevents undesirable crossfeed between channels by connecting said voltage or power source through a separate low pass filter to each of said elements.

I claim:

1. In a seismic prospecting system for measuring relative times of seismic wave arrival at spaced points, including a plurality of seismic wave receptors in contact with the ground at varying distances from a source of seismic waves, a plurality of substantially identical amplifiers having their inputs connected to different receptors, a trace recorder connected to the output of each amplifier and recording the waves received at said receptors as traces having a common time coordinate, the combination which comprises a single common voltage source connected to similar elements of each amplifier, each of the connections from the voltage source to the respective elements including means to attenuate waves within the frequency range of waves to be amplified by the respective amplifiers and recorded as related traces to be directly compared, whereby undesired cross-feed between amplifiers through the common voltage source and timing errors arising from such cross-feed are prevented.

2. In a seismic prospecting system for measuring relative times of seismic wave arrival at spaced points, including a plurality of seismic wave receptors in contact with the ground at varying distances from the source of seismic waves, and a corresponding trace recorder connected to each receptor, the trace recorders recording the waves at the receptors as traces having a common time coordinate, the combination which comprises a plurality of substantially identical amplifiers connected intermediate each receptor and the corresponding trace recorder, a single common voltage source connected to similar elements of each amplifier, decoupling means in a circuit including the voltage source and the connections to the respective elements to attenuate waves within the frequency range of waves to be amplified by the respective amplifiers and recorded as related traces to be compared, whereby undesired crossfeed between amplifiers through the common voltage source and timing errors arising from such cross-feed are prevented.

HERBERT HOOVER, Jr.